June 23, 1959 J. A. MORAN 2,891,802
FOLDABLE HAND CART
Filed Sept. 28, 1956 2 Sheets-Sheet 1
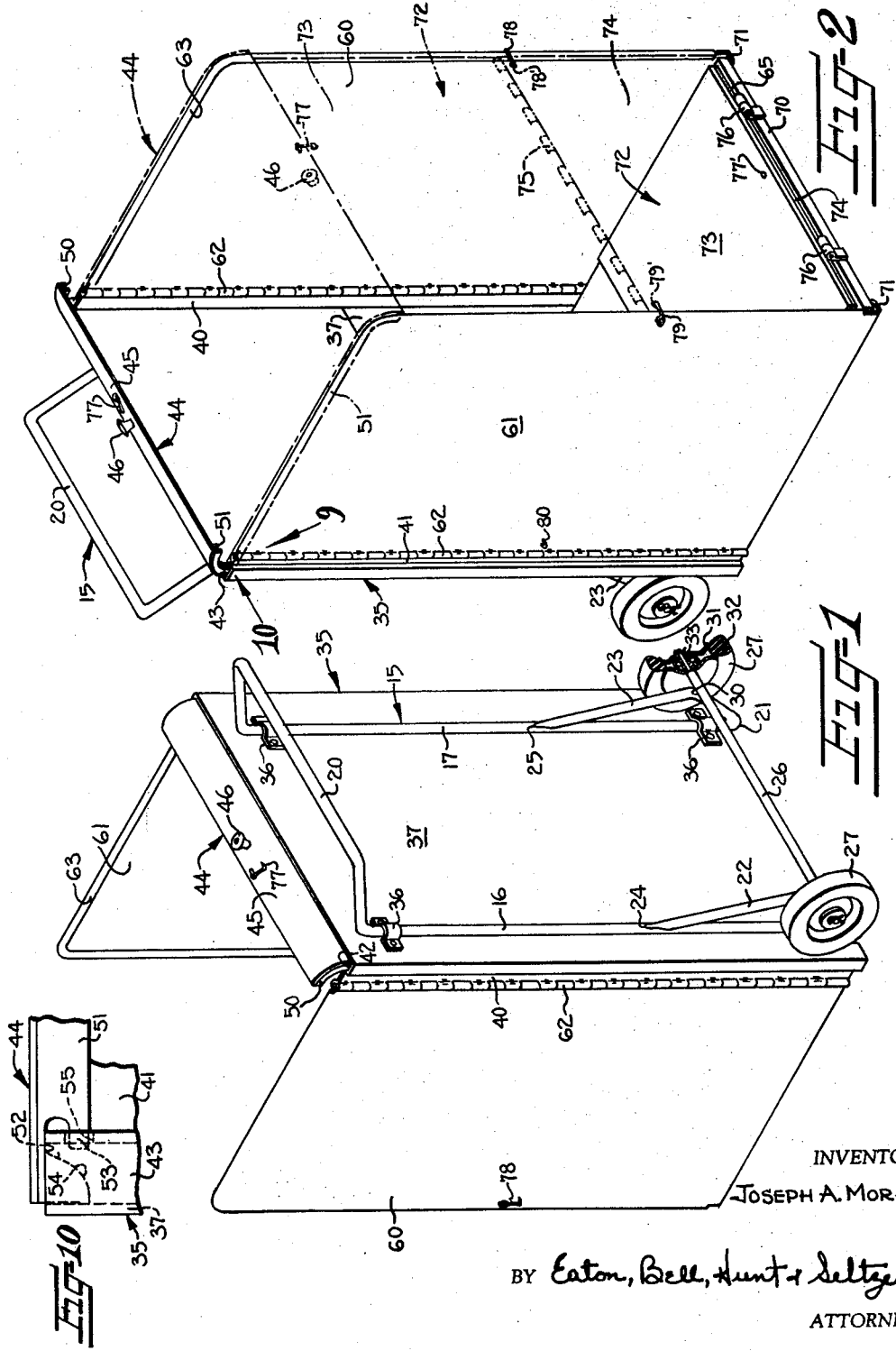
INVENTOR:
JOSEPH A. MORAN
BY Eaton, Bell, Hunt & Seltzer
ATTORNEYS

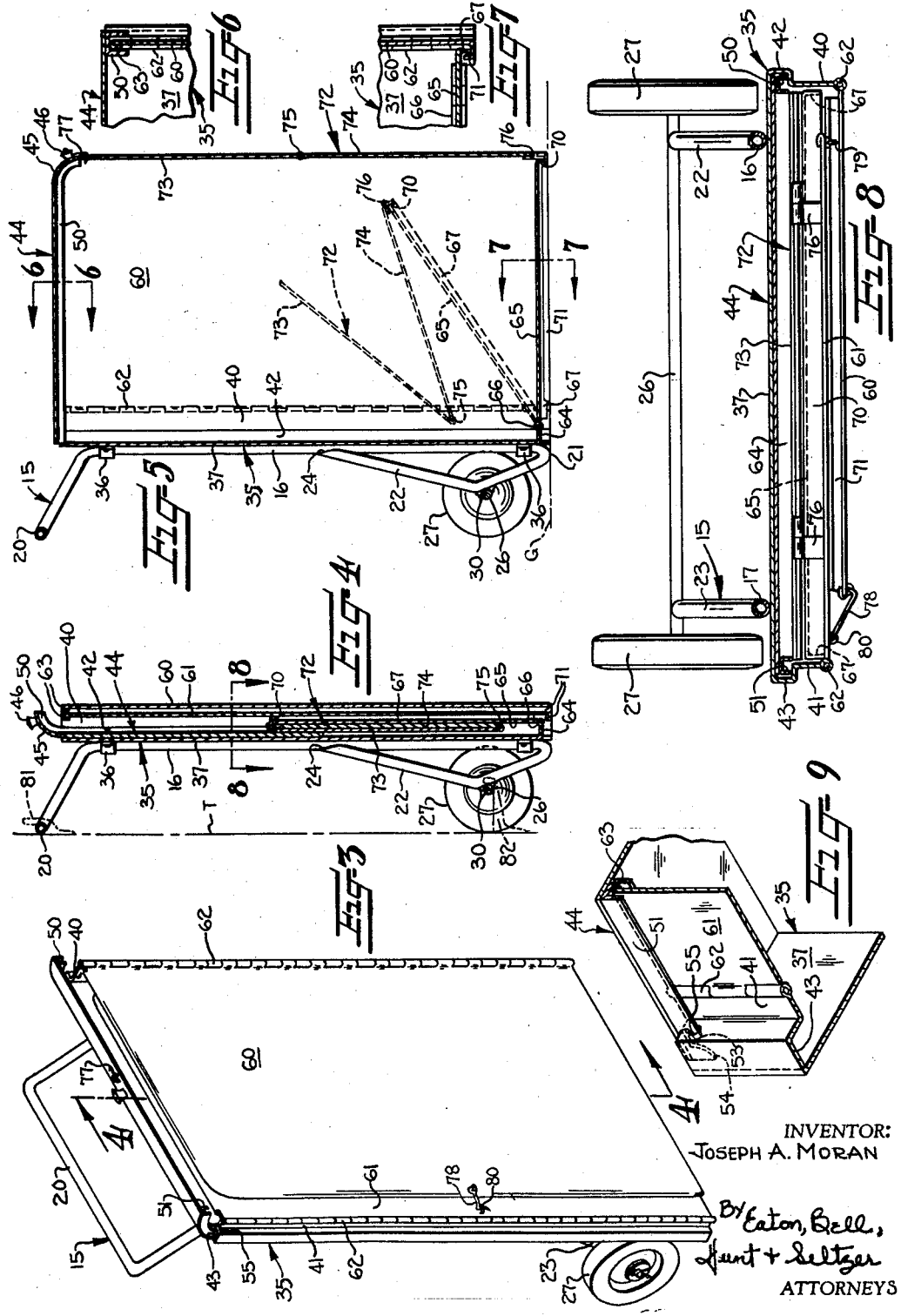

United States Patent Office 2,891,802
Patented June 23, 1959

2,891,802

FOLDABLE HAND CART

Joseph A. Moran, Thomasville, N.C.

Application September 28, 1956, Serial No. 612,727

5 Claims. (Cl. 280—36)

This invention relates to hand carts and more especially to a light weight but sturdy hand cart which is readily foldable into a compact unit to occupy a minimum amount of space for storage, and may be easily extended to define an enclosed cart for transporting perishable goods.

This invention is an improvement over that shown in my copending application Serial No. 373,416 filed August 10, 1953, now Patent No. 2,782,047, and entitled Folding Material Handing Cart.

It is an object of this invention to provide a hand cart which may be readily erected from a folded compact storage position to selectively define an enclosed box-like cart or wheeled container or a partially open cart.

It is a more specific object of this invention to provide a foldable hand cart which may be fully extended from folded position to define a fully enclosed cart having top, bottom, front, rear and side walls formed of sheet material for the transportation of the class of goods which should be protected from the elements, and which cart may, in the alternative, be only partially extended to define a partially enclosed cart having an open front, or, if desired, an open front and an open top for the transportation of elongated or bulky articles. The foregoing elements of the cart are so arranged and articulated into an integral unit that the unused top and/or front walls do not interfere with the operation of the partially erected truck and yet remain readily accessible at all times if needed.

It is another object of this invention to provide a foldable hand cart formed from a heat-reflecting material such as sheet aluminum for the transportation of refrigerated or heated goods such as ice cream or other foodstuffs.

Another object of this invention is to provide a hand cart of the type described wherein the wheels of the cart are out of ground engaging position when the fully or partially erected cart is in loading or unloading position thereby rendering the cart immobile and providing a stable support for the cart.

It is another object of the invention to provide a cart of the type described wherein pivot means are provided between the wheels and the body of the cart for facilitating movement of the fully or partially erected cart after loading or unloading from an immobile to a mobile position.

It is more specifically an object of this invention to provide a foldable hand cart including a wheeled frame and a thin elongated housing fixed to the frame and defining the back of the cart. A pair of side walls and a bottom wall are articulated to corresponding edges of the housing and a segmental front wall is hingedly connected to the bottom wall, the front wall being articulated intermediate its ends to define an upper portion and a lower portion. A top wall is slidable within the housing and extendable over the upper edges of the side walls to join with the upper portion of the front wall when the cart is fully erected.

Still another object of this invention is to provide stop means for limiting movement of the top wall relative to the housing and to provide fastening means for selectively maintaining the cart in erected or folded position.

Still another object of the invention is to provide in a structure of the type described a novel support means for the foldable bottom of the cart whereby surprisingly heavy loads may be transported by the cart in either fully or partially erected position.

Some of the objects of the invention having been stated, other objects will appear as the description proceeds when taken in connection with the accompanying drawings, in which—

Figure 1 is an isometric view looking at the back and one side of the foldable hand cart and showing the cart in partially extended position, with a portion of one of the wheels being shown in section;

Figure 2 is a view similar to Figure 1 but looking at the opposite side of the cart and showing in phantom lines the position the top and segmental front wall assume when the cart is in fully extended position;

Figure 3 is a view similar to Figure 2 but showing the cart in closed or folded position;

Figure 4 is a transverse vertical sectional view taken substantially along the line 4—4 in Figure 3 and showing in phantom lines the manner in which the folded cart may be suspended by brackets from the side of a truck or wall;

Figure 5 is a transverse vertical sectional view similar to Figure 4 but showing the truck in fully extended or open position, and showing in dotted lines the manner in which the bottom wall and segmental front wall are articulated and foldable into the confines of the housing;

Figure 6 is an enlarged longitudinal sectional view taken substantially along the line 6—6 in Figure 5 and showing the manner in which the top wall and side walls are fitted together at their corresponding edges;

Figure 7 is an enlarged longitudinal sectional view similar to Figure 6 but taken substantially along the line 7—7 and showing the manner in which the bottom wall and sides walls are fitted together along their corresponding edges to support the bottom wall;

Figure 8 is an enlarged sectional plan view taken substantially along the line 8—8 in Figure 4;

Figure 9 is an enlarged isometric detail view looking in the direction of the arrow in Figure 2 showing the locking means limiting outward movement of the top wall relative to the housing and further illustrating the manner in which the top is fitted to the side walls;

Figure 10 is an enlarged detail view looking in the direction of the arrow in Figure 2 and further illustrating the locking means for limiting outward movement of the top wall relative to the housing.

Referring more particularly to the drawings, the numeral 15 broadly designates the frame of the foldable hand cart, said frame preferably being of unitary tubular construction and including a pair of elongated support members 16 and 17. The support members 16 and 17 are bent outwardly adjacent their upper ends to define a handle 20 and are bent upon themselves adjacent their lower ends as at 21 to define triangularly shaped bearing members or axle supports 22 and 23 respectively. The ends of the unitary frame 15 are fixed to the medial portions of the support members 16 and 17, respectively, as at 24 and 25 by any suitable means.

An axle 26, having wheels 27 suitably journaled on opposite ends thereof, is suitably fixed to the bearings or axle supports 22 and 23 as at 30. The wheels 27 may be of conventional construction including a metal rim 31, rubber tires 32, and a bearing race 33.

The body of the cart which includes an elongated relatively thin housing 35 is secured to the frame 15 by any suitable means such as brackets 36. The housing 35 is of sheet metal construction, preferably aluminum, and includes a back panel 37 which serves as the back or rear wall of the cart.

The housing 35 also comprises side portions 40 and 41 which are flared outwardly adjacent their juncture with the back wall 37 to define trackways 42 and 43, respectively. The trackways 42 and 43 serve as guide means for a top 44 extending therebetween and vertically slidable within the trackways 42, 43.

The top 44 is of generally planar configuration but is curved forwardly and downwardly at its front edge as at 45, said curved forward edge serving as stop means for limiting downward movement of the top 44 within the trackways 42 and 43. A suitable handle such as indicated at 46 is preferably secured to the curved forward portion of the top 44. A pair of flange members 50 and 51 which are of generally U-shaped configuration in cross-section depend from the undersurface of the top 44 adjacent opposite side edges thereof and extend the entire length of the top, the flanges 50, 51 being curved to conform with the curvature of the forward edge of the top.

As most clearly seen in Figures 9 and 10 the outer legs 50', 51' of respective flanges 50, 51 are cut away as at 52 adjacent their ends remote from the curved forward edge of the top to define projections 53 extending longitudinally of their respective legs but spaced forwardly from the rear ends of said legs. The lines of cut 52 also define dogs 54 on the outer legs 50', 51', said dogs 54 being spaced rearwardly of the projections 53.

The trackways 42 and 43 are each provided with an aperture or bore 55 (Figure 3) adjacent their forward upper edges, said bores 55 being adapted to be engaged by the projections 53 on the flanges 50, 51 when the top 44 is extended into fully opened position (Figures 9 and 10). The bores 55 are also adapted to be engaged by the forward surface of the dogs 54 when the top 44 is withdrawn from the housing 35 preparatory to moving the top 44 to extended position, the bores 55 and dogs 54 thereby serving as stop means for limiting upward movement of the top 44 relative to the housing 35.

The top 44 is adapted to be withdrawn from its nested position within the housing 35 (Figures 1 and 2) to extended position (Figures 2 and 5) where it is supported by side walls 60 and 61 articulated as at 62 to the forward edges of respective side portions 40, 41 of the housing 35. The side walls 60 and 61 are preferably formed of sheet metal of generally planar configuration and may be provided with beaded or folded edges 63 for purposes of rigidity. As most clearly seen in Figures 6, 8 and 9 the flanges 50 and 51 on the undersurface of the top 44 are adapted to straddle the upper edges of the side walls 60 and 61 when the top 44 and side walls 60 and 61 are extended to fully open position thereby adding rigidity to the structure by limiting lateral movement of the side walls and top relative to each other.

The housing 35 also includes a lower or bottom portion 64 (Figures 4 and 5) extending forwardly a relatively short distance from the lower extremity of the back wall 37 and spaced above the lower ends of the side portions 40, 41 of the housing 35.

A bottom wall 65, adapted to form the floor of the cart, extends from the forward edge of the lower portion 64 of the housing 35, said bottom wall 65 being articulated to the portion 64 as by a hinge 66. The side edges of the bottom wall 65 are provided with depending or downturned flanges 67 which extend substantially the entire length of the bottom wall 65, being spaced forwardly from the hinge 66 at their rear ends and joining with a downturned flange 70 depending from the forward edge of the bottom wall 65.

When the bottom 65 and side walls 60, 61 are erected, the flanges 67 on the bottom wall 65 are adapted to be received within J-shaped flanges 71 extending inwardly and upwardly from the bottom edges of the side walls 60 and 61, as most clearly seen in Figure 7. The vertical legs of the J-shaped flanges 71 are preferably cut away adjacent the forward edges of the side walls 60 and 61 to accommodate the flange 70 on the bottom wall 65 so that when the cart is erected the end portions of the flange 70 rest on the horizontal leg portions of the J-shaped flanges 71 (Figure 5). Thus the bottom wall 65 of the erected cart is fully supported by the housing 35 and side walls 60, 61, and the mating flanges on the bottom and side walls serve to confine these elements against relative lateral movement thereby stabilizing the structure.

The front of the cart is closed by a segmental front wall, broadly indicated at 72, and comprising upper and lower articulated sections 73 and 74 joined together as by a hinge 75. The lower section 74 of the front wall 72 is hingedly connected to the bottom wall 65 as by a pair of strap hinges 76 extending between the front wall section 74 and the flange 70 on the bottom wall 75.

It will be noted in the drawings that the upper forward corners of the side walls 60, 61 are rounded to conform to the curvature of the forward edge of the top 44 with the result that the forward edge of the top 44 extends downwardly a short distance over the front of the cart when the same is fully erected to butt against the upper edge of the upper section 73 of the front wall 72. The curved overhang of the top 44 is preferably provided with a hook 77 adapted to engage a bore 77' adjacent the upper edge of the front section 73 for releasably connecting the top 44 and the front wall 72 in erected position. Additional hooks 78 and 79 may be provided on the side walls 60, 61 for releasably engaging respective apertures 78', 79' in the lower front wall section 74 to additionally secure the front wall to the side walls.

The cart is constructed in such a manner as to occupy a minimum of space in folded position, where it may be releasably secured by engaging the hook 78 on side wall 60 with an eye 80 provided adjacent the rear edge of side wall 61. The folded cart may be conveniently suspended from brackets 81 and 82 extending from a wall or the side of a vehicular delivery truck I, as shown in Figure 4.

The utility of the foldable hand cart may be increased by forming the panels which define the top, bottom, front, rear and side walls from sheet aluminum as this substance is not only light weight but has the additional advantage of affording heat insulation for the contents of the cart. Thus, the enclosed insulated cart of this invention is particularly adapted for the efficient delivery of refrigerated or heated articles, such as bulk quantities of ice cream or soup.

Method of operation

The cart may be fully erected from the folded position shown in Figures 3, 4 and 8 to define an enclosed conveyor by first releasing the hook 78 on the side wall 60 from the eye 80 provided on the side wall 61. The side walls 60 and 61 are then folded outwardly into alinement with respective side portions 40, 41 of the housing 35, and the bottom panel 65, together with the segmental front wall 72, is then swung outwardly from the housing 35 and downwardly about the pivot point 66 to engage the flanges 67 on the bottom panel 65 with the flanges 71 on the side walls 60 and 61.

The front wall 72 may then be swung outwardly about the pivot point 76 beyond the forward edge of the bottom wall 65 so that the front wall 72 extends in axial alinement with the bottom wall 65 thereby providing an access into the cart for loading the same. Or, if desired, the lower section 74 of the front wall 72 may be secured in place by the hooks 77, 78 and the upper section 73 allowed to depend from its hinged connection 75 until it is desired to enclose the cart. The upper section 73 may then be folded upwardly about the pivot point 75 to the position shown in Figure 5 for engagement with the top 44.

The top 44 may be withdrawn from the housing 35 at any stage of erection, but is preferably not withdrawn until after erection of the side walls 60, 61 which support the top in erected position.

It is contemplated that it may sometimes be desirable to erect the cart to only a partially open position for transporting articles a short distance under conditions which do not warrant the enclosing of the load carried by the cart. This may be accomplished by erecting only the side walls 60, 61 and bottom 65 in the manner described. The segmental front wall 72 is allowed to remain folded in superposed relation upon the bottom wall 65 in the manner shown in solid lines in Figure 2 and the articles to be carried are placed on the folded upper front wall section 73. The top 44 may or may not be allowed to remain within the housing 35, as desired. Thus, the top and front of the cart may be left open without impairing the sturdiness of the cart so that the same load may be carried whether the cart is fully or partially erected. It should also be noted that the partially erected cart constitutes a compact unit without any undesirable projections while at the same time the top and front are readily available in the event it should be desired to enclose the cart.

It will be observed that the curved portions 21 on the frame 15 are adapted to engage the ground to partially support the truck when the fully or partially erected cart is in loading or unloading position as shown in Figure 5. It will be further noted in Figure 5 that the wheels 27 are so arranged relative to the frame 15 as to be out of ground engaging position when the cart is in loading or unloading position, thereby immobilizing the cart and preventing any possibility of the wheels becoming accidentally actuated to dislodge the cart. This position of the wheels relative to the frame has the additional advantage of enabling the operator to instantly lower the cart from the position shown in Figure 5 to mobile position on the wheels without danger of the cart slipping and without the necessity of the operator bracing the cart as it is lowered from immobile to mobile position.

When it is desired to fold the truck from the position shown in Figure 5 to the position shown in Figures 3, 4 and 8, the fastening hooks are released and the upper and lower sections 73 and 74 of the segmental front wall 72 are folded inwardly, together with the bottom wall 67, within the housing 35 in the manner shown in dotted lines in Figure 5 to the position shown in Figures 4 and 8. The top 44 is then raised to disengage the projection 53 from the bore 55 and permit the top 44 to be lowered along the trackways 42 and 43 within the housing 35. The side wall 61 is then folded about its hinged connection 62 against the undersurface of the bottom wall 65 and the side wall 60 is then folded about its hinged connection 62 into engagement with the side wall 61, whereupon the hook 78 is fastened to the eye 82 on the side wall 61.

In order to permit the side walls to be folded into snug parallel engagement with one another, the side portion 40 of the housing 35 is of slightly greater length than is the side portion 41 of the housing 35, thus affording additional space for the flanges and fastening hooks carried by the panels.

It is thus seen that there is provided a foldable hand cart which is constructed in such a manner as to permit the same to be readily folded into compact storing position and just as readily unfolded into partially or fully erected position to selectively define an open or enclosed cart which is extremely strong and durable for the transportation of heavy, bulky articles.

In the drawings and specification there has been set forth a preferred embodiment of the invention, and although specific terms are employed they are used in a generic and descriptive sense only and not for purposes of limitation, the scope of the invention being defined in the claims.

I claim:

1. A foldable cart comprising a wheeled frame and a housing; said housing including a back wall secured to the frame and defining the rear of the cart, first and second side portions extending forwardly from opposite side edges of the back wall and a bottom portion extending forwardly a relatively short distance from the lower edge of the back wall; a pair of side walls articulated to the side portions of the housing and a bottom wall articulated to the bottom portion of the housing, said side walls and bottom wall being selectively movable into folded position within the housing in parallel relation to the back wall and into extended position in perpendicular relation to the back wall, the side portions of the housing being flared outwardly adjacent their juncture with the back wall to define trackways, a top slidably mounted within said trackways, said top being selectively movable into extended position perpendicular to the back wall and overlying the side walls and into folded position within the housing parallel to the back wall, a pair of U-shaped flanges depending from the lower surface of the top in extended position, each of said U-shaped flanges being adapted to straddle the upper edge of one of said side walls when the cart is erected, stop means for limiting upward movement of the top relative to the housing, said stop means comprising cut away portions defining projections on said U-shaped flanges, said trackways being provided with bores adjacent their upper ends for reception of said projections when the top is in extended position, and interlocking means carried by the side walls and bottom wall for releasably maintaining the bottom wall and the side walls in extended position.

2. A foldable cart comprising a wheeled frame and a housing; said housing including a back wall secured to the frame and defining the rear of the cart, first and second side portions extending forwardly from opposite side edges of the back wall and a bottom portion extending forwardly a relatively short distance from the lower edge of the back wall; a pair of side walls articulated to the side portions of the housing and a bottom wall articulated to the bottom portion of the housing, said side portions of the housing being flared outwardly adjacent their juncture with the back wall to define trackways, a top slidably mounted within said trackways, said side walls and bottom wall being selectively movable into extended positions in perpendicular relation to the back wall and into folded positions within the housing in parallel relation to the back wall, and said top being selectively movable into extended position perpendicular to the back wall and overlying the extended side walls and into folded position within the housing parallel to the back wall.

3. A foldable cart comprising a wheeled frame and a housing; said housing including a back wall secured to the frame and defining the rear of the cart, first and second side portions extending forwardly from opposite side edges of the back wall and a bottom portion extending forwardly a relatively short distance from the lower edge of the back wall; a pair of side walls articulated to the side portions of the housing and a bottom wall articulated to the bottom portion of the housing, said side portions of the housing having guide means adjacent their juncture with the back wall defining trackways, a top slidably mounted within said trackways, said side walls and bottom wall being selectively movable into extended positions in perpendicular relation to the back wall and into folded positions within the housing in parallel relation to the back wall, and said top being selectively movable into extended position perpendicular to the back wall and overlying the extended side walls and into folded position within the housing parallel to the back wall.

4. A foldable cart comprising a wheeled frame and a housing; said housing including a back wall secured to the frame and defining the rear of the cart, first and second side portions extending forwardly from opposite side edges of the back wall and a bottom portion extending forwardly a relatively short distance from the lower edge of the back wall; a pair of side walls articulated to the side portions of the housing, a bottom wall articulated to the bottom portion of the housing and a front wall articulated to the edge of the bottom wall remote from its connection with the housing, said side portions of the housing being flared outwardly adjacent their juncture with the back wall to define trackways, a top slidably mounted within said trackways, said side walls and bottom wall being selectively movable into extended positions in perpendicular relation to the back wall and into folded positions within the housing in parallel relation to the back wall, said top being selectively movable into extended position perpendicular to the back wall and overlying the extended side walls and into folded position within the housing parallel to the back wall, and said front wall being selectively movable from folded position within the housing into extended position perpendicular to the bottom wall and engaging the extended top to enclose the erected cart.

5. A foldable cart comprising a wheeled frame and a housing; said housing including a back wall secured to the frame and defining the rear of the cart, first and second side portions extending forwardly from opposite side edges of the back wall and a bottom portion extending forwardly a relatively short distance from the lower edge of the back wall; a pair of side walls articulated to the side portions of the housing and a bottom wall articulated to the bottom portion of the housing, said side portions of the housing being flared outwardly adjacent their juncture with back wall to define trackways, a top slidably mounted within said trackways, said side walls and bottom wall being selectively movable into extended positions in perpendicular relation to the back wall and into folded positions within the housing in parallel relation to the back wall, said top being selectively movable into extended position perpendicular to the back wall and overlying the extended side walls and into folded position within the housing parallel to the back wall, and stop means for limiting upward movement of the top relative to the housing.

References Cited in the file of this patent
UNITED STATES PATENTS

| | | |
|---|---|---|
| 1,510,456 | Cadwalader | Oct. 7, 1924 |
| 1,826,949 | Nelson | Oct. 13, 1931 |
| 1,953,351 | Klee | Apr. 3, 1934 |
| 2,221,504 | Beasley | Nov. 12, 1940 |
| 2,415,655 | Reinert | Feb. 11, 1947 |
| 2,461,482 | Schaus | Feb. 8, 1949 |
| 2,515,876 | Kaufman | July 18, 1950 |
| 2,589,358 | Feiertag | Mar. 18, 1952 |

FOREIGN PATENTS

| | | |
|---|---|---|
| 312,478 | Switzerland | Mar. 15, 1956 |